Figure 1:
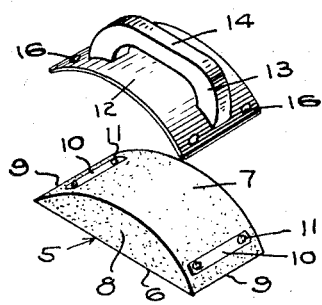

Nov. 3, 1959     C. H. BECKER     2,910,714

SPONGE RUBBER UTILITY TOOL HAVING DETACHABLE HEAD

Filed June 18, 1958

INVENTOR.
CHARLES H. BECKER,
BY
ATTORNEY

United States Patent Office 2,910,714
Patented Nov. 3, 1959

2,910,714

SPONGE RUBBER UTILITY TOOL HAVING DETACHABLE HEAD

Charles H. Becker, Miami, Fla.

Application June 18, 1958, Serial No. 742,786

2 Claims. (Cl. 15—244)

This invention relates to a sponge rubber tool having a detachable handle to facilitate the handling of a sponge rubber body and to protect the hands of the operator against damage by material being applied by the device.

The invention contemplates a tool having a body of sponge rubber that is provided with a flat working surface and an upper arcuate surface that terminates with the lower surface in a relatively sharp edge at opposite ends of the device and whereby to facilitate the use of the tool in numerous capacities, such as a plasterer's float, a scrubbing device for cleaning walls or other surfaces and also as an applicator for paint of various consistencies and with the sharp ends of the device permitting the application of the materials on a treatment of the surfaces into relatively sharp corners, such as the corners defined by a wall and a ceiling.

The invention also contemplates a sponge rubber tool having a metallic backing plate that is detachably connected to the sponge rubber body to facilitate removal of the backing plate and a handle carried thereby whereby to effectively clean the sponge by continuous absorption and squeezing or, the backing plate and its attached handle constitutes a relatively permanent element that is applicable to other sponge devices of similar nature and that have previously been provided with connector elements corresponding to connector elements carried by the backing plate and with the sponge rubber body being provided for independent sale or replacement for use with the backing plate and handle of this device.

Novel features of construction and operation of the invention will be more clearly apparent during the course of the following description, reference being had to the accompanying drawings wherein has been illustrated the preferred forms of the device and wherein like characters of reference are employed to denote like parts throughout the several figures.

Figure 2:
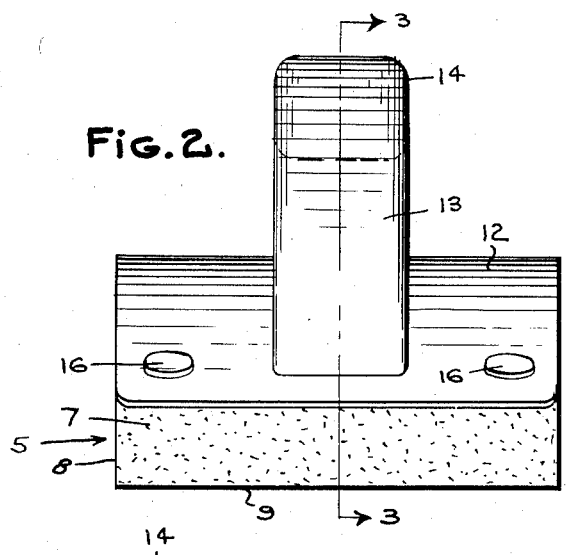
Figure 3:
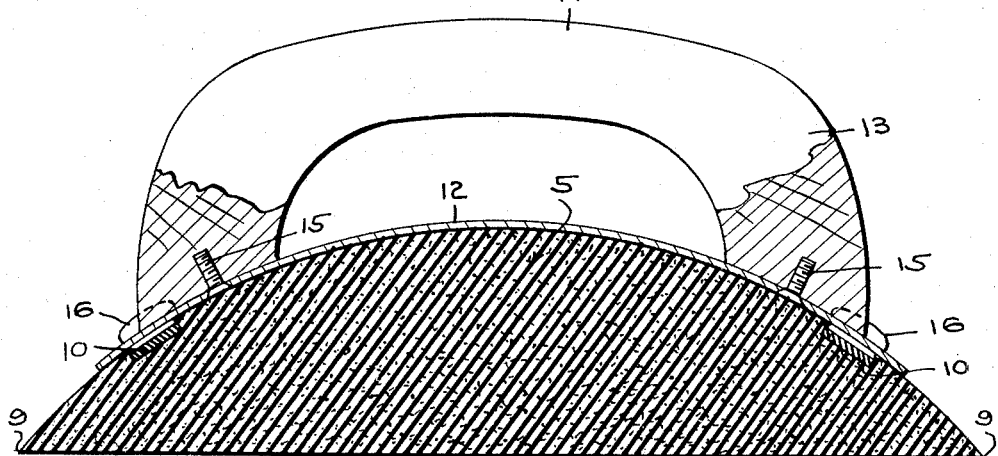
Figure 4:
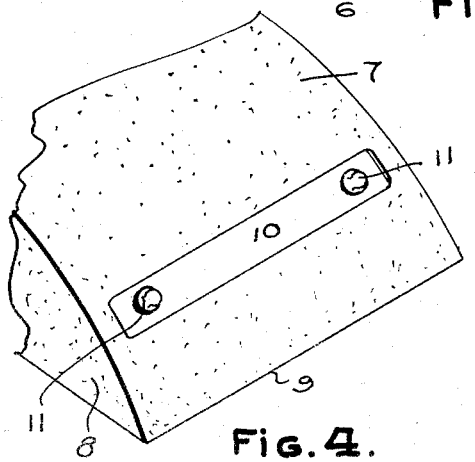
Figure 5:
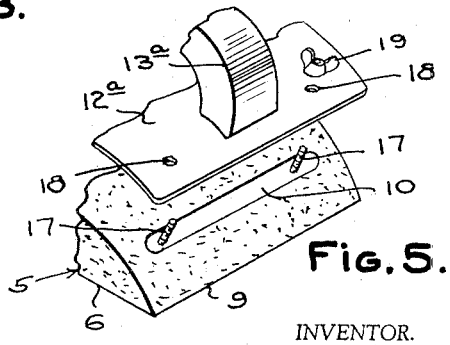

In the drawings:

Figure 1 is a composite perspective view of a sponge rubber body and a handle carrying backing plate, Figure 2 is an enlarged end elevation of the device, Figure 3 is a longitudinal section taken substantially on line 3—3 of Figure 2, Figure 4 is a fragmentary perspective view of a sponge rubber element and its attached connector strip for a backing plate and, Figure 5 is a fragmentary perspective view of a slightly modified form.

Referring specifically to the drawings, the numeral 5 designates a sponge rubber body that is generally rectangular in top plan view and that embodies a flat bottom 6, an arcuate top 7 and flat side walls 8. The top wall 7 at its point of meeting with the bottom wall 6, defines relatively sharp ends 9. Permanently connected into the arcuate top 7 adjacent its opposite ends, are a pair of transversely extending and preferably rubber strips 10, slightly recessed into the surface of the sponge and cemented or vulcanized into the sponge for permanent connection thereto. The strips 10 carry male studs 11, constituting one-half section each of conventional snap fasteners. The studs 11 may be formed of any desirable material and preferably protected in a suitable manner to retard rusting, since it is contemplated that the sponge rubber body 5 will be used in various fluent materials.

Detachably connected to and overlying the arcuate top 7, to conform thereto in curvature, is a preferably metallic backing plate 12, formed of any desirable material, such as aluminum or plastic or any other material calculated to resist corrosion or rusting in use. The plate 12 is provided with a preferably wood handle 13, curved to form a comfortable hand grip 14. The handle 13 is connected to the backing plate 12 by screws 15. The plate 12 adjacent its opposite ends and adjacent each longitudinal side, is provided with fixed female snap fastener elements 16, adapted to have mating relation to the studs 11 of the strips 10. The spacing of the studs 11 and the spacing of the snap fastener elements 16 are substantially identical. The snap members 16 are readily snapped into engagement with the studs 11 at opposite ends of the sponge body 5 to effectively connect the backing plate 5 carrying the handle 13. The snap fasteners, constituting the elements 11 and 16 are fully capable of supporting the sponge rubber body in all positions of use and with any of the numerous coating materials or the like to which the tool is applicable. While the backing plate 12 and the handle 13 have been illustrated as separate elements, it will be clearly apparent that the backing plate and the handle may be integrally formed of any desired moldable material, such as plastic. Since the snap fasteners normally embody spring elements, it follows that these connectors shall be formed of metal to prolong their usefulness.

In the form of the invention illustrated in Figure 5, the strip 10 is provided with threaded studs 17, that engage within apertures 18, carried by a backing plate 12a having a handle 13a. The same sponge rubber body 5 is employed, having the sharp ends 9 and a flat surface 6. In this form of the invention the backing plate 12a is engaged with the studs 17 and preferably winged nuts 19 are engaged with the upper projecting ends of the studs 17 to securely hold the backing plate in assembled relation to the sponge rubber body. In all other respects, this form of the invention functions in a substantially identical manner to that previously described.

In the use of the device, the backing plate 12 is snapped into engagement with the studs 11 and in such position, the backing plate 12 conforms to the curved top wall of the sponge, effectively maintaining the shape of the sponge and also effectively preventing distortion of the sponge in use. As a plasterer's float, it will be apparent that the device functions in a highly desirable manner, since the device as a float can engage directly into the corners of meeting wall sections or into the corners defined by a ceiling and a side wall, with the handle being spaced so as to permit of the free operation of the device as a float. The sharp ends 9 greatly facilitate this action in operating the device into relatively close areas thus resulting in a relatively perfect job. The backing plate 12 and the handle 13 protect the hand of the operator, especially when the device functions as a plasterer's float and it has been well recognized in the past, that floats formed of sponge rubber or similar materials are held in the hand of the operator and the lime and other materials in the plaster soon create excessive damage to the fingers of the operator. With the arrangement shown in this application, the operator's hand is fully protected against the harmful elements in the plaster. After the float has functioned for a particular job, the backing plate 12 is removed and the sponge rubber body 5 is cleaned by frequent immersion in clear water and squeezing to remove all of the plaster deposits that might have accumulated therein. After the body 5 has been thoroughly cleaned, the backing plate is again snapped thereon and the device left to dry for a future operation. The device also furnishes a very desirable wall and ceiling scrubbing tool and greatly facilitates such an operation, as the device can be conveniently held by the handle 13, avoiding to a large extent water or the like running down the arm of the operator, especially when being used as a ceiling cleaning tool and it can be quickly and easily rinsed for further cleaning or rinsing of the areas being cleaned. The device also has functioned in a highly satisfactory manner as a paint applicator, much in the manner of the well known "roll-on" paint rollers. The sharp ends permit the operator to cut into areas, such as the corners between adjacent walls or into corners between a ceiling and a side wall, where it becomes necessary to make a sharp cut between paints of different colors. The sponge rubber tool functions also as a painting element for woodwork and around windows and the like, since the sharp ends 9 function to successfully cut around the window glass and other areas difficult to paint and that normally require a special tool.

It will be apparent from the foregoing that a very desirable tool has been provided. The tool utilizes a sponge rubber body having desirable features, such as a relatively heavy body portion that terminates at its opposite ends in sharp edges and with the bottom wall being formed flat to be parallel with surfaces being treated. The backing plate and its connecting elements with respect to the sponge body are desirable in that the backing plate and its handle 13 are relatively permanent and applicable to replacement of sponge rubber bodies, since it will be entirely apparent that the sponge rubber bodies eventually wear and require replacement. The structure is extremely simple, cheap to manufacture, is strong, durable and highly effective for the purposes indicated.

It is to be understood that the invention is not limited to the precise construction shown, but that changes are contemplated as readily fall within the spirit of the invention as shall be determined by the scope of the subjoined claims.

Having described my invention, what I claim as new and desire to secure by Letters Patent is:

1. A sponge rubber tool of the character described that comprises a body of sponge rubber rectangular in plan having a flat bottom and flat sides, the top of the body being longitudinally curved to terminate with the bottom in sharp wedge-shaped ends, a metallic backing plate that overlies the curved top and that is shaped to conform thereto, the backing plate terminating inwardly of the ends of the body whereby the ends are flexible, flexible strips secured to the sponge and embedded in the top transversely thereof, the strips being provided with snap-fastener elements, the backing plate being also apertured and provided with co-operating snap-fastener elements and whereby the backing plate may be detachably connected to the body, a non-metallic handle connected to the backing plate whereby to control the movement of the sponge rubber body without contact by the hands of the operator.

2. The tool according to claim 1, wherein the transverse flexible strips are recessed into the body and with the snap-fastener elements of the strips being male studs, the snap-fastener elements of the backing plate being female for snapping engagement with the studs, the said strips being vulcanized into the sponge-rubber body.

References Cited in the file of this patent

UNITED STATES PATENTS 2,259,653    Mitchell _____ Oct. 21, 1941

FOREIGN PATENTS 164,716      Australia _____ Aug. 22, 1955
780,647      Great Britain _____ Aug. 7, 1957
1,091,251    France _____ Oct. 27, 1954